April 5, 1949.  G. KRAUSE  2,466,596
MOVABLE TOOL HOLDER FOR LATHES
Filed Nov. 28, 1944  2 Sheets-Sheet 1
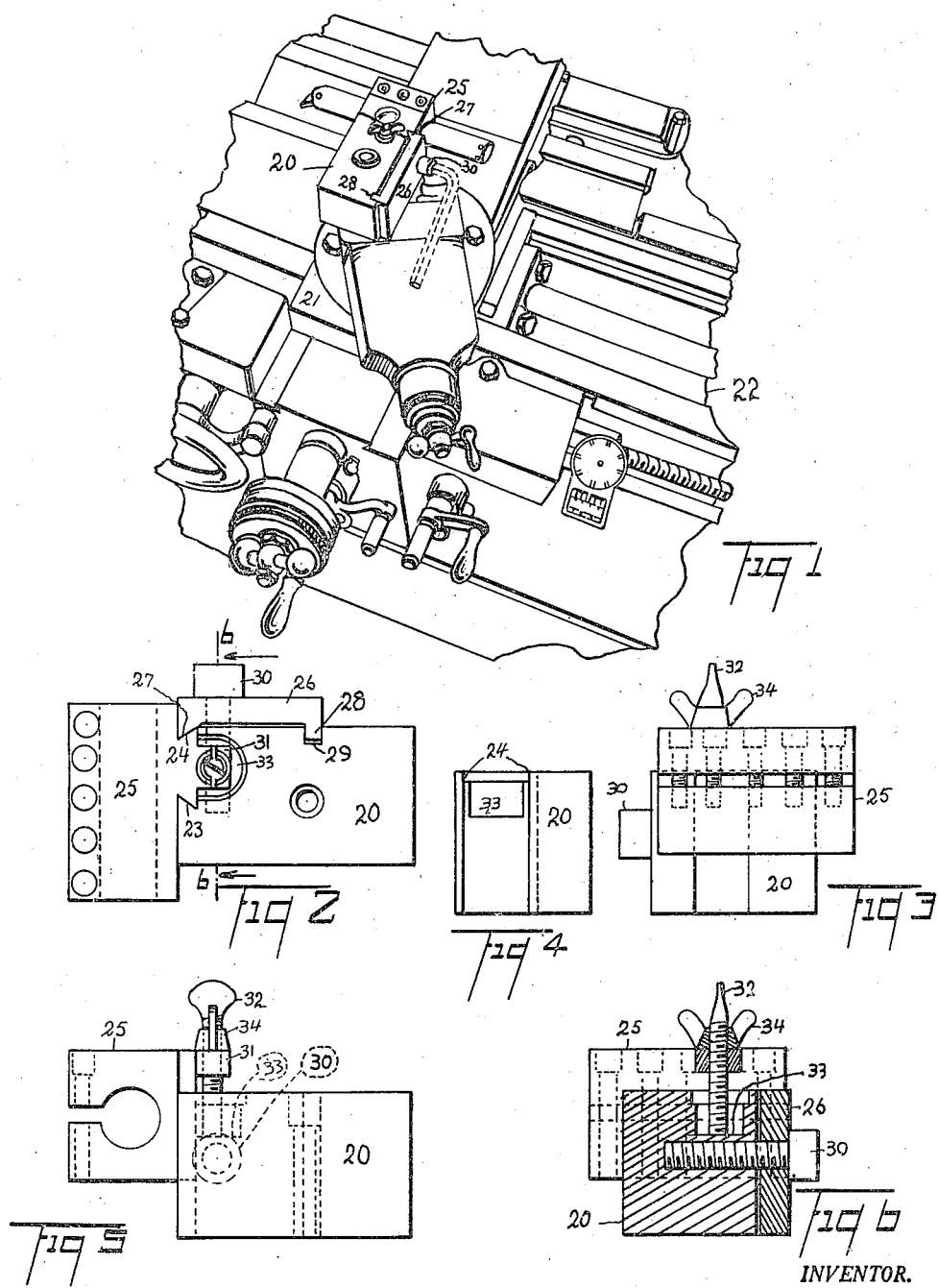
INVENTOR.
Gunter Krause

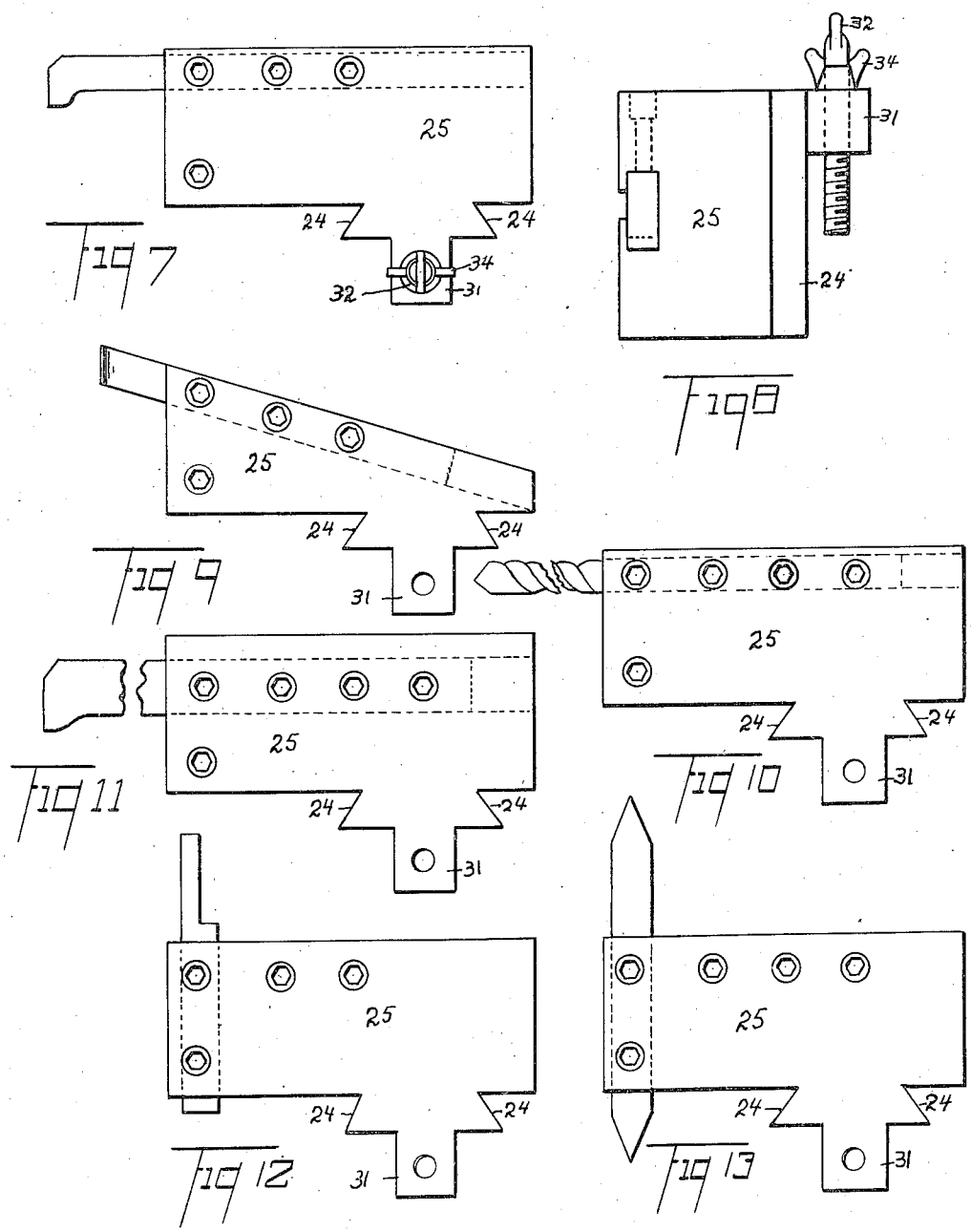

Patented Apr. 5, 1949

2,466,596

UNITED STATES PATENT OFFICE 2,466,596

MOVABLE TOOLHOLDER FOR LATHES

Gunter Krause, Los Angeles, Calif.

Application November 28, 1944, Serial No. 565,481

2 Claims. (Cl. 82—36)

The object of my invention is to provide a new and useful improved quick changing tool holder for engine lathes which will convert any engine lathe into a very profitable turret lathe.

The invention further consists of the novel features and parts and combination of the same as will be fully described hereinafter and then pointed out in the claims.

A practical embodiment of the invention is repsented in the accompanying drawings, forming a part of this application, in which similar characters of reference indicate corresponding parts in the several views.

Figure 1 is a top plan view in perspective of my improved tool holder attached to the lathe; the lathe being partly shown;

Figure 2 is a detached top view of my improved tool holder;

Figure 3 is a front elevation of Fig. 2;

Figure 4 is a front elevation of Fig. 2 with the tool holder removed;

Figure 5 is a side elevation of Fig. 2;

Figure 6 is a cross sectional view on the line 6—6 of Fig. 2; looking in the direction of the arrow;

Figure 7 is a side elevation of the tool holder having a "facing" tool secured thereto;

Figure 8 is a front elevation of Fig. 7;

Figure 9 is a side elevation of the tool holder with a "turning" tool secured therein;

Figure 10 is a similar view as Fig. 7 with a "drill" secured therein;

Figure 11 is a similar view as Figs. 7—9 and 10 with a "boring" tool secured therein;

Figure 12 is a similar view as Figs. 7—9—10 and 11 with a "cutting off" tool secured therein; and Figure 13 is a similar view as Figs. 7—9—10—11 and 12, but with a "threading" tool secured therein.

The improvement consists essentially of a holding block 20 which is permanently secured to a sliding plate 21 (Fig. 1) of the lathe 22. Said holding block 20 having a dovetail groove 23 in which a dovetail portion 24 of a tool holder 25 slides. To one side of the holding block 20 is secured a removable clamp plate 26 having a dovetail portion 27 at one end to engage the dovetail portion 24 of the tool holder 25 and a square portion 28 at the other end to engage in a recess 29 of the holding block 20. A screw 30 passes through said plate 26 into the holding block 20 to hold the tool in a rigid position at all times.

To the rear of said tool holding sliding plate 25 is formed a projection 31 integral therewith through which an adjusting screw 32 passes, said adjusting screw 32 resting upon the tool holding block 20 in the recess 33 (Fig. 6); a set nut 34 being provided on said adjustable screw 32 so that, when the tool is finally adjusted to the required position it will remain fixed in such position.

By this means of construction any number of tools may be interchangeably placed in the movable tool holder that is required on a job; such as a "facing tool," "turning tool," "drilling tool," "boring tool," "threading tool, or cutting tool" and can all be arranged at the start of the job by the operator of the lathe so that no time is lost in making the necessary change from one tool to another. In using this movable tool holder, in the event a tool becomes dull or broken the operator releases the screw 30, to loosen up on the clamp plate 26; removes the tool holder 25 from holding block 20, sharpens the tool or replaces it with a new one and returns the tool holder to position on the holding block 20, fastening it in place by the screw 30 and is then ready to proceed with his work. In former operations the operator had to reset a sharpened, or a new tool for a given job and thus lost valuable time while, by using my invention, the adjusting screw will always bring the cutting edge to the center of the work. In Figures 7, 9, 10, 11, 12 and 13 the different tools above mentioned are shown secured in the detachable tool holder.

While I have shown and described a specific embodiment of my invention, I do not limit myself to the exact details of construction and arrangement shown, but may employ such changes and modifications as occasion may require coming within the scope and meaning of the appended claims.

What I claim as new:

1. In a tool holding device for lathes, a rectangular supporting member having a recess in an end thereof, a tool holder having a rib to be received in said recess, said rib having its opposite sides undercut and said recess a side undercut to receive one of the undercut sides of the rib, means carried by said rib and engageable with said supporting member to adjust said holder and the tool bit carried thereby relatively to the work, and a clamp plate detachably mounted on said supporting member and having an undercut offset portion at one end thereof constituting the other side wall of said recess and engageable with the adjacent undercut side of said rib to secure the same and said holder rigidly in positions of adjustment, said supporting member having a groove in a side face thereof, a flange inturned from the opposite end of said clamp plate and engaged in said groove to maintain said offset portion accurately aligned with the opposed wall of said recess to assure of the rigid securement of said rib therebetween.

2. The invention as defined in claim 1, with said supporting member and said tool holder both oblong in form, said recess centered in the end face of said supporting member and said rib located on a side of said tool holder adjacent an end thereof, and said tool holder adjusting means constituted in a screw element carried centrally of said rib.

GUNTER KRAUSE.

REFERENCES CITED

The following references are of record in the file of this patent:

UNITED STATES PATENTS

| Number | Name | Date |
|---|---|---|
| 1,592,156 | Reed | July 13, 1926 |
| 2,205,879 | Fasnaugh | June 25, 1940 |
| 2,389,858 | Kyle | Nov. 27, 1945 |

FOREIGN PATENTS

| Number | Country | Date |
|---|---|---|
| 487,121 | Great Britain | June 15, 1938 |